(12) United States Patent
Chen (10) Patent No.: US 11,297,784 B2
(45) Date of Patent: Apr. 12, 2022

(54) GARDEN HOSE FLOW CONTROL VALVE WITH A FOLDABLE PANEL

(71) Applicant: SHIN TAI SPURT WATER OF THE GARDEN TOOLS CO., LTD, Chang-Hua Hs (TW)

(72) Inventor: Chin-Yuan Chen, Chang-Hua Hsien (TW)

(73) Assignee: SHIN TAI SPURT WATER OF THE GARDEN TOOLS CO., LTD., Chang-Hua Hsien (TW)

( * ) Notice: Subject to any disclaimer, the term of this patent is extended or adjusted under 35 U.S.C. 154(b) by 239 days.

(21) Appl. No.: 16/805,325

(22) Filed: Feb. 28, 2020

(65) Prior Publication Data

US 2021/0267145 A1 Sep. 2, 2021

(51) Int. Cl.
*F16K 31/48* (2006.01)
*A01G 25/16* (2006.01)
*F17C 13/04* (2006.01)

(52) U.S. Cl.
CPC ............ *A01G 25/165* (2013.01); *F17C 13/04* (2013.01); *F17C 2205/0394* (2013.01); *Y10T 137/86389* (2015.04)

(58) Field of Classification Search
CPC ............ Y10T 137/86389; A01G 25/16; A01G 25/165
USPC .......................................................... 239/70
See application file for complete search history.

(56) References Cited

U.S. PATENT DOCUMENTS

| 4,592,505 A * | 6/1986 | Bruninga ............... A01G 25/16 137/624.18 |
| 4,633,905 A * | 1/1987 | Wang ..................... F16K 21/16 137/624.11 |
| 4,807,664 A * | 2/1989 | Wilson ................. A01G 25/165 137/624.11 |
| 5,135,168 A * | 8/1992 | Wang ................... G04G 15/006 239/70 |
| 5,262,936 A * | 11/1993 | Faris ..................... A01G 25/16 239/70 |
| 5,715,866 A * | 2/1998 | Granger ............... A01G 25/165 137/487.5 |
| 6,337,635 B1 * | 1/2002 | Ericksen ............. A01G 25/165 137/624.11 |
| 6,719,010 B1 * | 4/2004 | Yi-Chang ............ A01G 25/165 137/624.11 |
| 10,959,385 B1 * | 3/2021 | Chen ........................ E03B 7/04 |
| 2008/0251601 A1 * | 10/2008 | Nies ..................... A01G 25/167 239/65 |

(Continued)

*Primary Examiner* — Robert K Arundale (57) ABSTRACT

A garden hose flow control valve has a main body, a positioning block, a connecting disk and a timer. The main body has an intake opening and at least an outlet opening, and a pivoting portion is provided on one side. The pivoting portion includes two trunnions. The trunnion has a limiting protrusion, and the positioning block has a through hole and is provided with a plurality of first positioning recesses. The connecting disk is provided with a first positioning pin pushed by the first spring. A protrusion is provided on the side surface and a sleeve is extended, and the second positioning recess is provided on the outer ring of the sleeve. The timer is installed in a movable housing, and a connecting opening is on one side of the movable housing. The connecting opening is provided with a second positioning pin pushed by the second spring.

7 Claims, 11 Drawing Sheets

(56) References Cited

U.S. PATENT DOCUMENTS

| | | | |
|---|---|---|---|
| 2008/0255708 A1* | 10/2008 | Nies | A01G 25/167 700/284 |
| 2010/0163126 A1* | 7/2010 | Leer | A01G 25/165 137/624.11 |
| 2010/0230510 A1* | 9/2010 | Wilson | A01G 25/165 239/70 |
| 2011/0226363 A1* | 9/2011 | Yu | A01G 25/165 137/624.11 |
| 2012/0117837 A1* | 5/2012 | Renner | A01G 25/16 40/514 |
| 2014/0229025 A1* | 8/2014 | Nickerson | G05D 7/0676 700/284 |
| 2015/0053288 A1* | 2/2015 | Cheng | A01G 25/165 137/624.11 |
| 2016/0282833 A1* | 9/2016 | Wang | G05B 19/108 |

\* cited by examiner

GARDEN HOSE FLOW CONTROL VALVE WITH A FOLDABLE PANEL

BACKGROUND OF INVENTION

Field of Invention

The present invention relates to a garden hose flow control valve, and more particularly to a foldable garden hose flow control valve with a foldable panel.

Description of the Related Art

Figure 10:
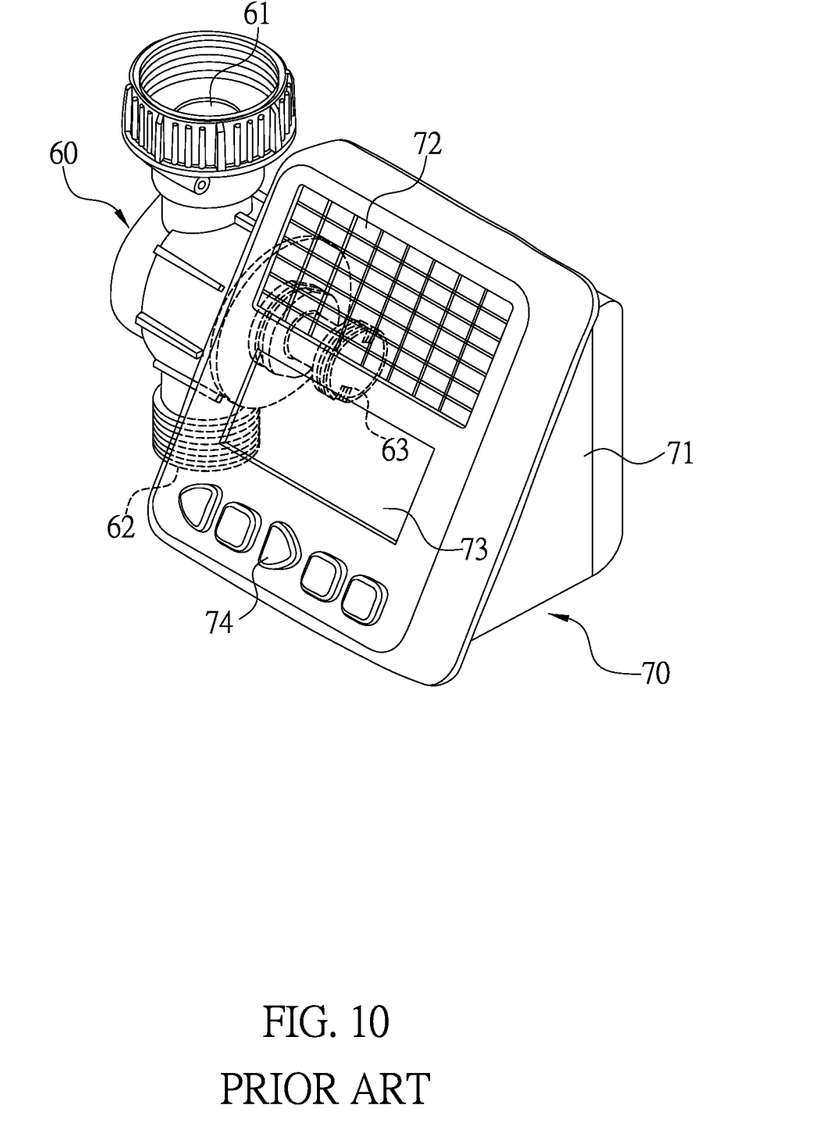
FIG. 10 is a structure drawing of prior art.

Current known garden flow control valve, as shown in FIG. 10, includes: a water valve body 60 and a timer 70. The water valve body 60 has an intake opening 61, an outlet opening 62 and an electromagnetic solenoid 63. The electromagnetic solenoid 63 is used to control the opening or closing of the water valve body 60 through the timer 70, and the timer 70 is disposed on one side of the water valve body 60 and is used to supply electric current to the electromagnetic solenoid 63 for operation. The timer 70 includes a main body 71 fixed and combined with the electromagnetic solenoid. The main body 71 is provided with a solar panel 72, a display panel 73, and an operation interface 74. The water valve body 60 is installed between the irrigation water pipes, and the operation interface 74 is used to set the duration and interval of automatic watering. Furthermore, the display panel 73 displays the actual value for watering.

However, the conventional structure described above still has the following problems: Since the display panel 73 and the main body 71 of the time setter 70 are directly fixed on the water valve body 60, there cannot be relative rotation to the water valve body 60, and the display panel 73 has a limited viewing angle. Therefore, when the garden flow control valve is installed, the display panel 73 cannot be placed at a better viewing angle and cannot be adjusted as required, which may cause difficulties in operation and settings. Moreover, the water valve body 60 and the time setting device 70 cannot be folded together, so the overall volume is large, and it will occupy relatively large space in packaging or storage.

Therefore, it is desirable to provide a garden hose flow control valve with a foldable panel to mitigate and/or obviate the aforementioned problems.

SUMMARY OF THE INVENTION

An objective of present invention is to provide a garden hose flow control valve with a foldable panel, which is capable of improving the above-mention problems.

In order to achieve the above mentioned objective, a garden hose flow control valve with a foldable panel has a main body, a positioning block, a connecting disk and a timer. The main body has an intake opening and at least one outlet opening with a pivoting portion on a side, the pivoting portion having two separated trunnions, a limiting protrusion disposed on an inner side of each trunnion such that the main body is capable of using the pivoting portion to pivotally connect to the connecting disk. The positioning block has a through hole at a center of the positioning block, and a plurality of first positioning recesses on an outer side of the positioning block, an end of the positioning block comprising an engaging groove for engaging with the limiting protrusions, such that when the positioning block is stacked above the trunnions, the positioning block is not rotable. The connecting disk has a first positioning pin pushed by a first spring, a pivoting aperture at a side edge for aligning with the through hole of the positioning block placed above the trunnions, and a pivot shaft passing through the trunnions, the pivoting aperture and the through hole, such that the connecting disk is pivoted on the main body and the first spring pushes the first positioning pin into a first positioning recess; and a protrusion with a sleeve is provided on one side of the connecting disk, the sleeve configured to jacket onto a movable housing of the timer, and a plurality of second positioning recesses are disposed around the sleeve. The timer is mounted in the movable housing and has a display panel and an operation interface on the movable housing, a side of the movable housing is provided with a connecting opening, the connecting opening further having a second positioning pin pushed by a second spring; wherein when the connecting opening of the movable housing is assembled with the sleeve of the connecting disk, the second positioning pin is engaged with one of the second positioning recesses, and the timer and the movable housing are locked.

Other objects, advantages, and novel features of invention will become more apparent from the following detailed description when taken in conjunction with the accompanying drawings.

DETAILED DESCRIPTION OF THE PREFERRED EMBODIMENT

First, please refer to FIG. 1 to FIG. 5. A garden hose flow control valve comprises a main body 10, a positioning block 20, a connecting disk 30 and a timer 40. The main body 10 has an intake opening 11 and at least one outlet opening 12 with a pivoting portion 13 on a side. The pivoting portion 13 having two separated trunnions 131, a limiting protrusion 132 is disposed on an inner side of each trunnion 131 such that the main body 10 is capable of using the pivoting portion 13 to pivotally connect to the connecting disk 30. The positioning block 20 has a through hole 21 at its center and a plurality of first positioning recesses 22 on its outer side. An end of the positioning block 20 comprises an engaging groove 23 for engaging with the limiting protrusions 132, such that when the positioning block 20 is stacked above the trunnions 131, the positioning block 20 is not rotable. The connecting disk 30 has a first positioning pin 32 pushed by a first spring 31, a pivoting aperture 301 at a side edge for aligning with the through hole 21 of the positioning block 20 placed above the trunnions 131, and a pivot shaft 50 passing through the trunnions 131, the pivoting aperture 301 and the through hole 21. Therefore, the connecting disk 30 is pivoted on the main body 10 and the first spring 31 pushes the first positioning pin 32 into a first positioning recess 22, and without adjusting the connecting disk 30, the first positioning pin 32 locks the connecting disk 30. A protrusion 302 with a sleeve 303 is provided on one side of the connecting disk 30, the sleeve 303 is configured to jacket onto a movable housing 41 of the timer 40, and a plurality of second positioning recesses 304 are disposed around the sleeve 303.

The timer 40 is mounted in the movable housing 41 and has a display panel 401 and an operation interface 402 on the movable housing 41. a side of the movable housing 41 is provided with a connecting opening 411, and the connecting opening 411 further has a second positioning pin 43 pushed by a second spring 42. When the connecting opening 411 of the movable housing 41 is assembled with the sleeve 303 of the connecting disk 30, the second positioning pin 43 is engaged with one of the second positioning recesses 304, and the timer 40 and the movable housing 41 are locked.

Figure 11:
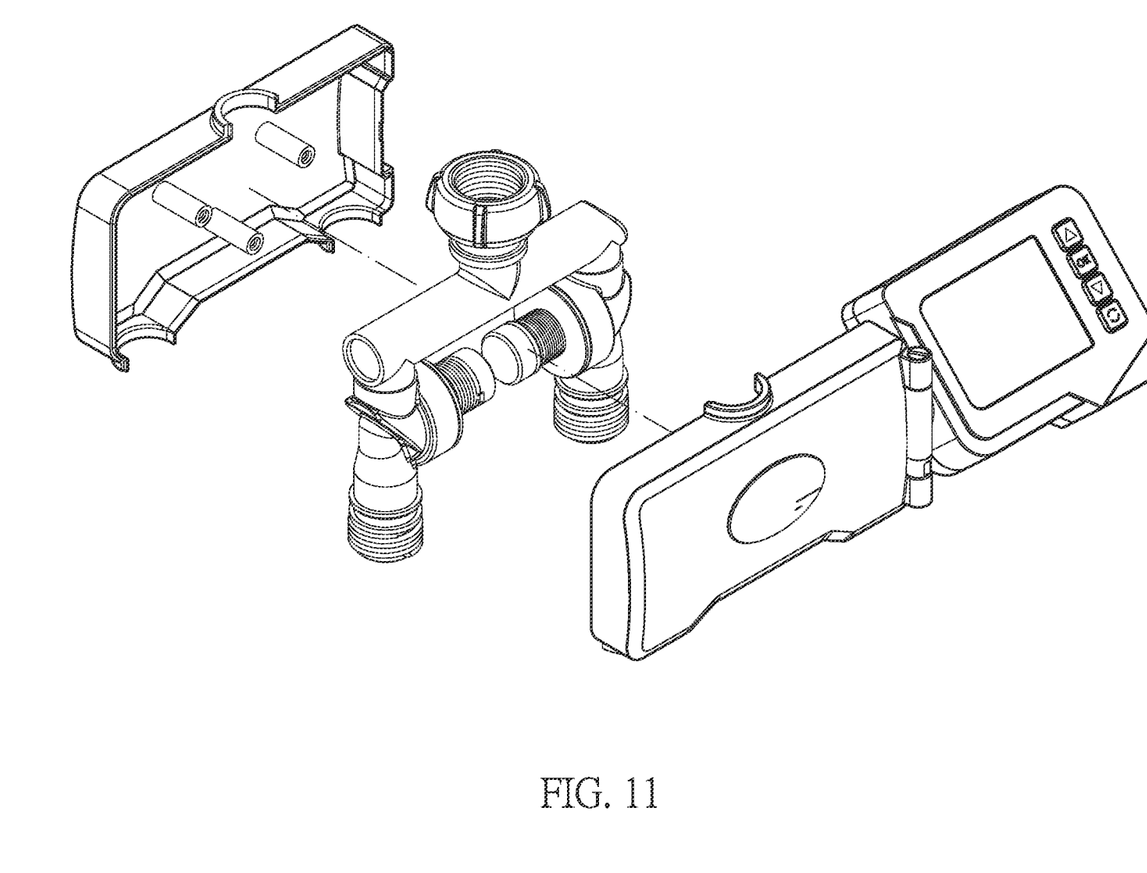
FIG. 11 is a perspective view a main body in an embodiment of the invention that further comprises an electromagnetic valve.

Preferably, the main body 10 further comprises an electromagnetic valve, as shown in FIG. 11, for closing or opening the main body 10.

Preferably, the main body 10 further has an indentation 14 for accepting the connecting disk 30.

Preferably, the connecting disk 30 has a first disk portion and a second disk portion paring with each other, and the pivoting aperture, the protrusion and the sleeve are mounted on the first disk portion.

Preferably, the movable housing 41 comprises two corresponding casings 44, the protrusion 302 of the connecting disk 30 has a ring slot 305, and the connecting opening 411 of the movable housing 41 has a clasp 412 configured to engage the ring slot 305 to prevent the movable housing 41 from separating from the connecting disk 30.

Preferably, the timer 40 includes a battery, which supplies power to the timer 40 and the electromagnetic valve.

Preferably, the timer 40 water-resistant

The present invention provides a foldable flow control valve. The movable housing 41 drives the timer 40 to a relatively upright angle so dust and mud particles attached to the display panel 401 can be tapped off so the display panel 401 is always kept clean.

Figure 1:
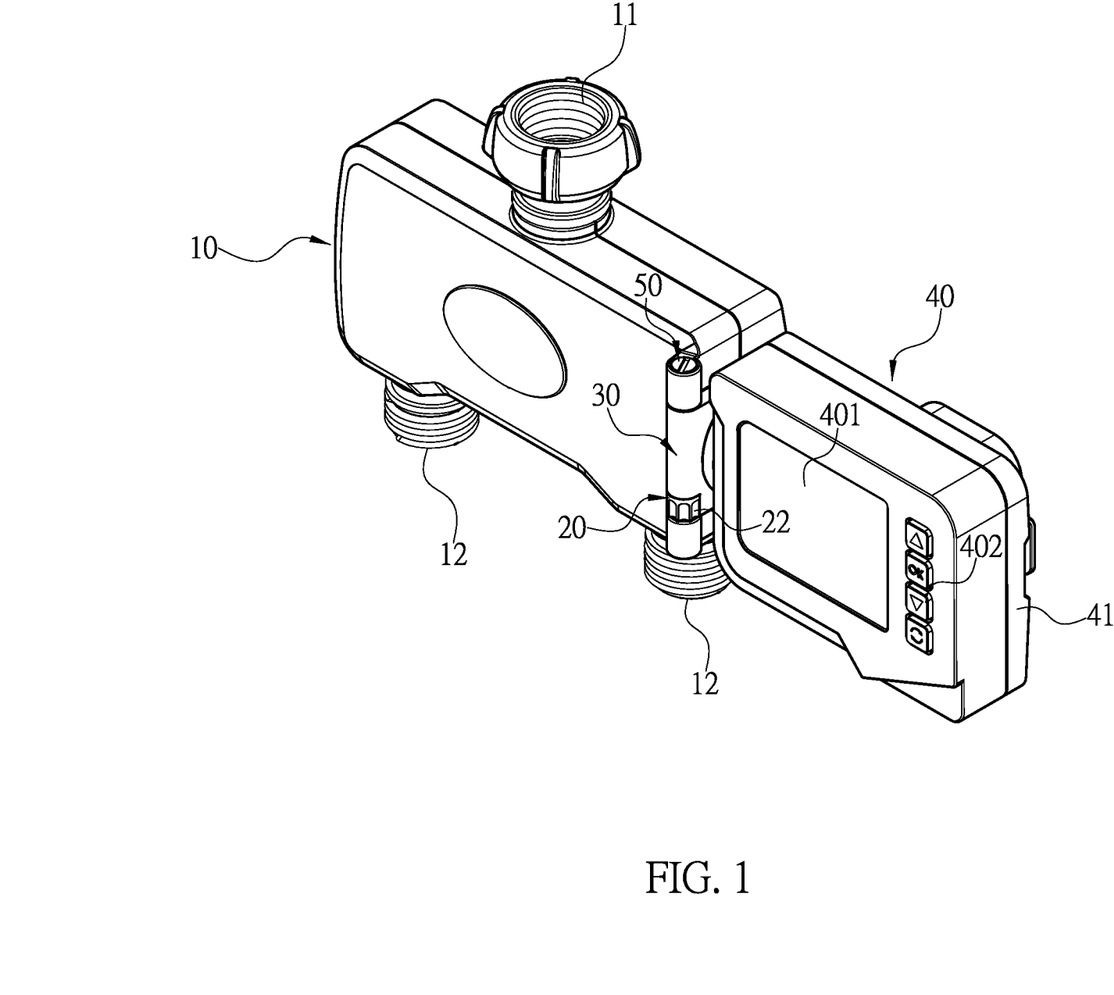
FIG. 1 is a perspective view of a preferred embodiment according to the present invention.
Figure 2:
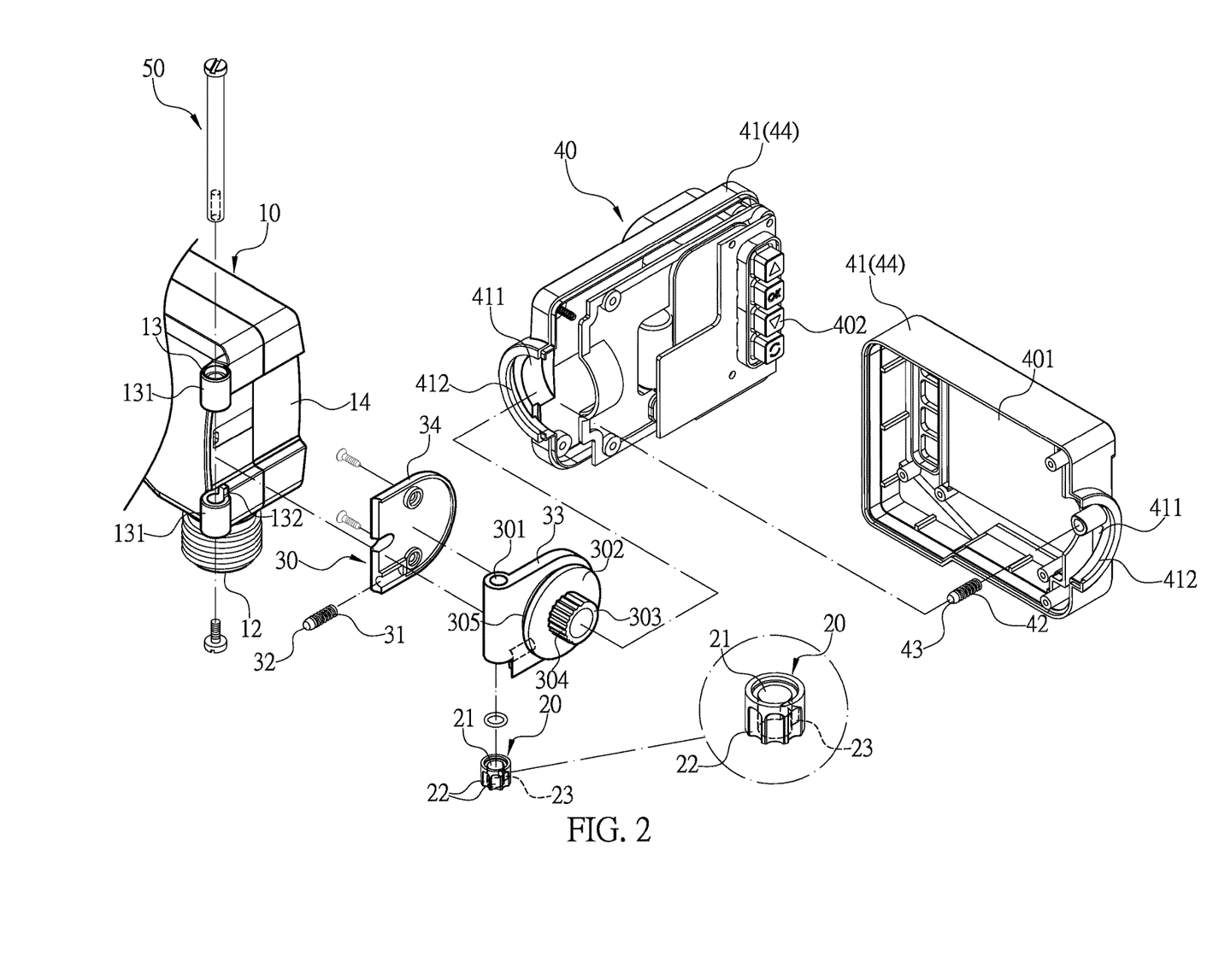
FIG. 2 is a perspective exploded view of the preferred embodiment according to the present invention.
Figure 3:
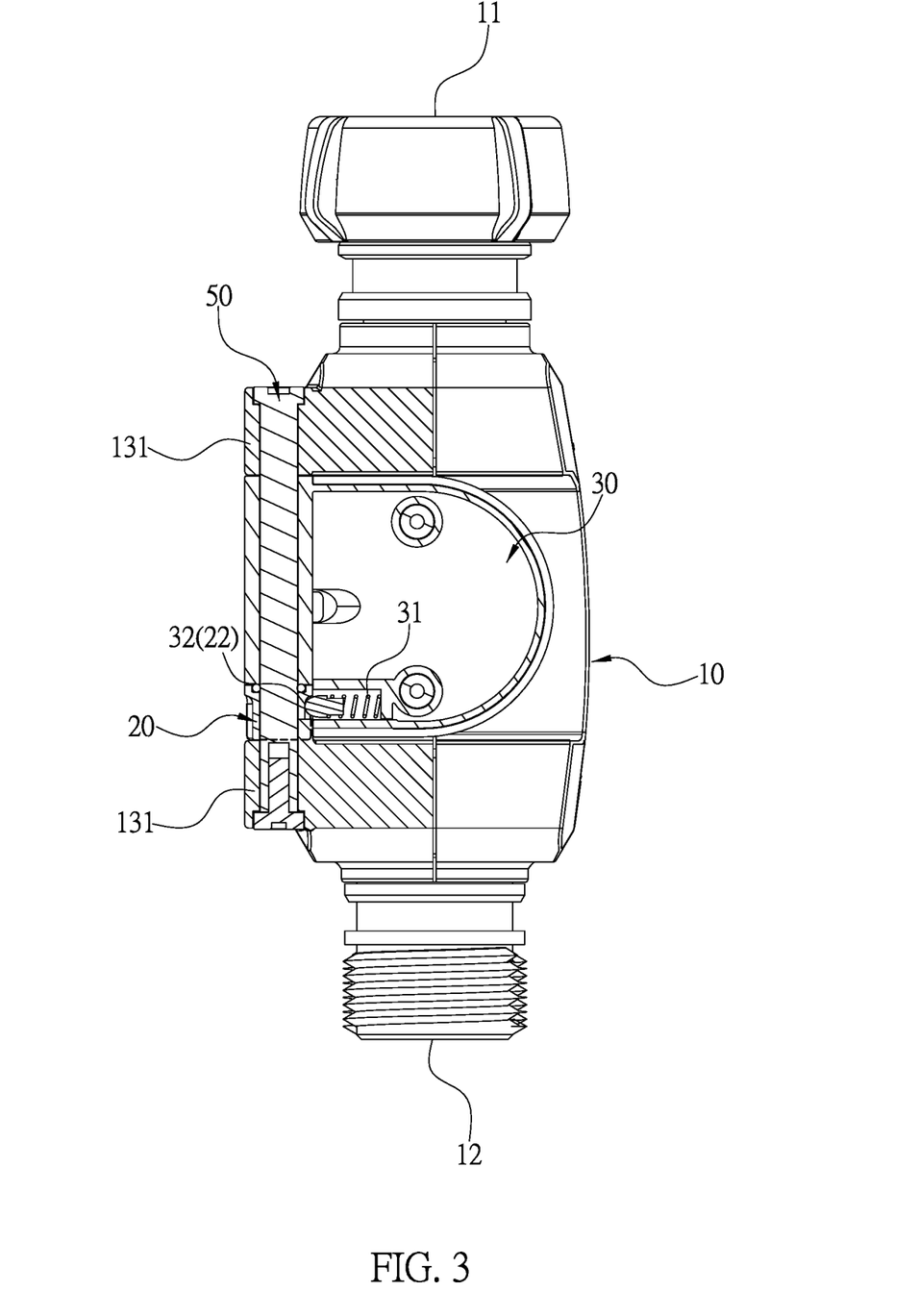
FIG. 3 is a sectional view of the preferred embodiment according to the present invention.
Figure 4:
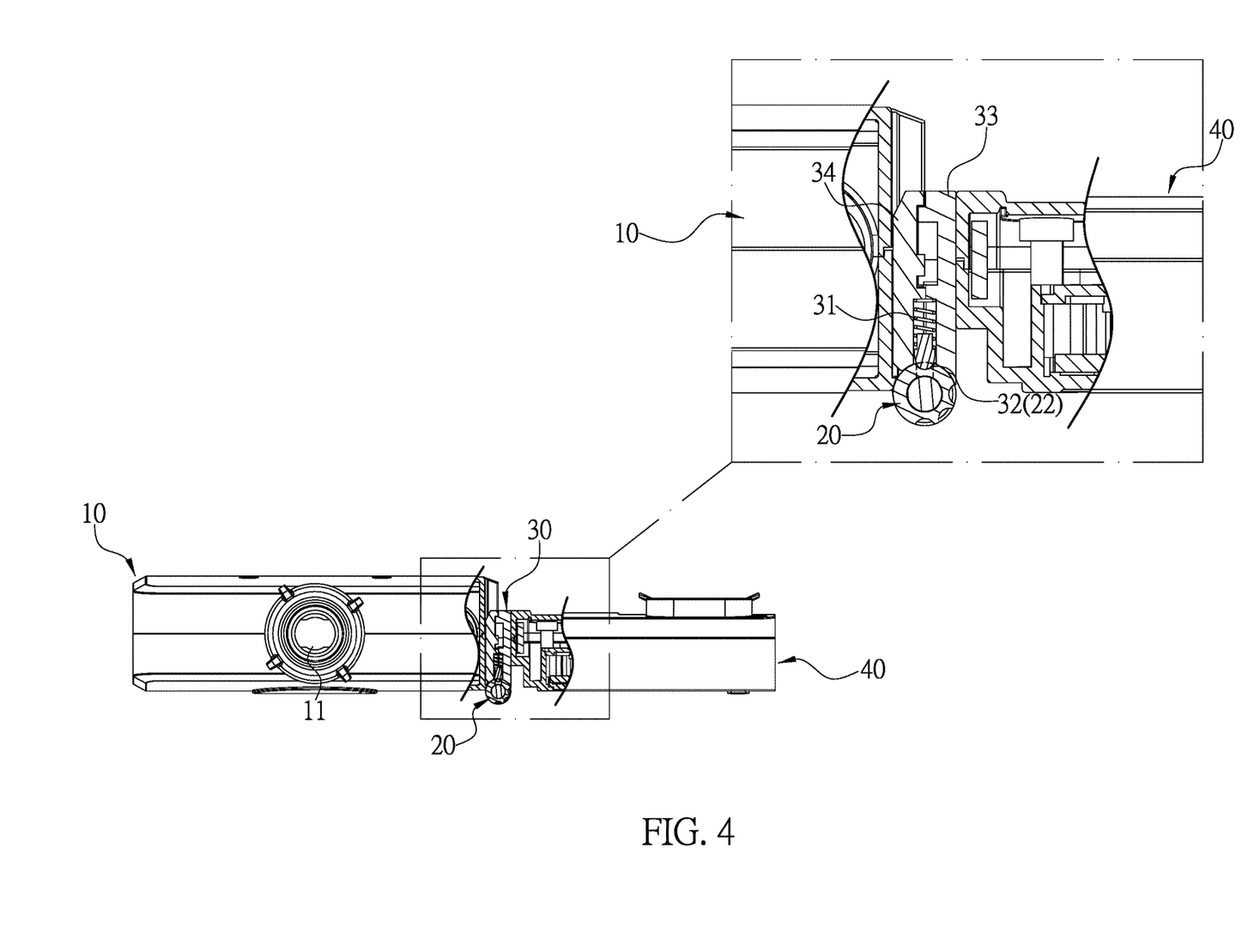
FIG. 4 is another sectional view of the preferred embodiment according to the present invention.
Figure 5:
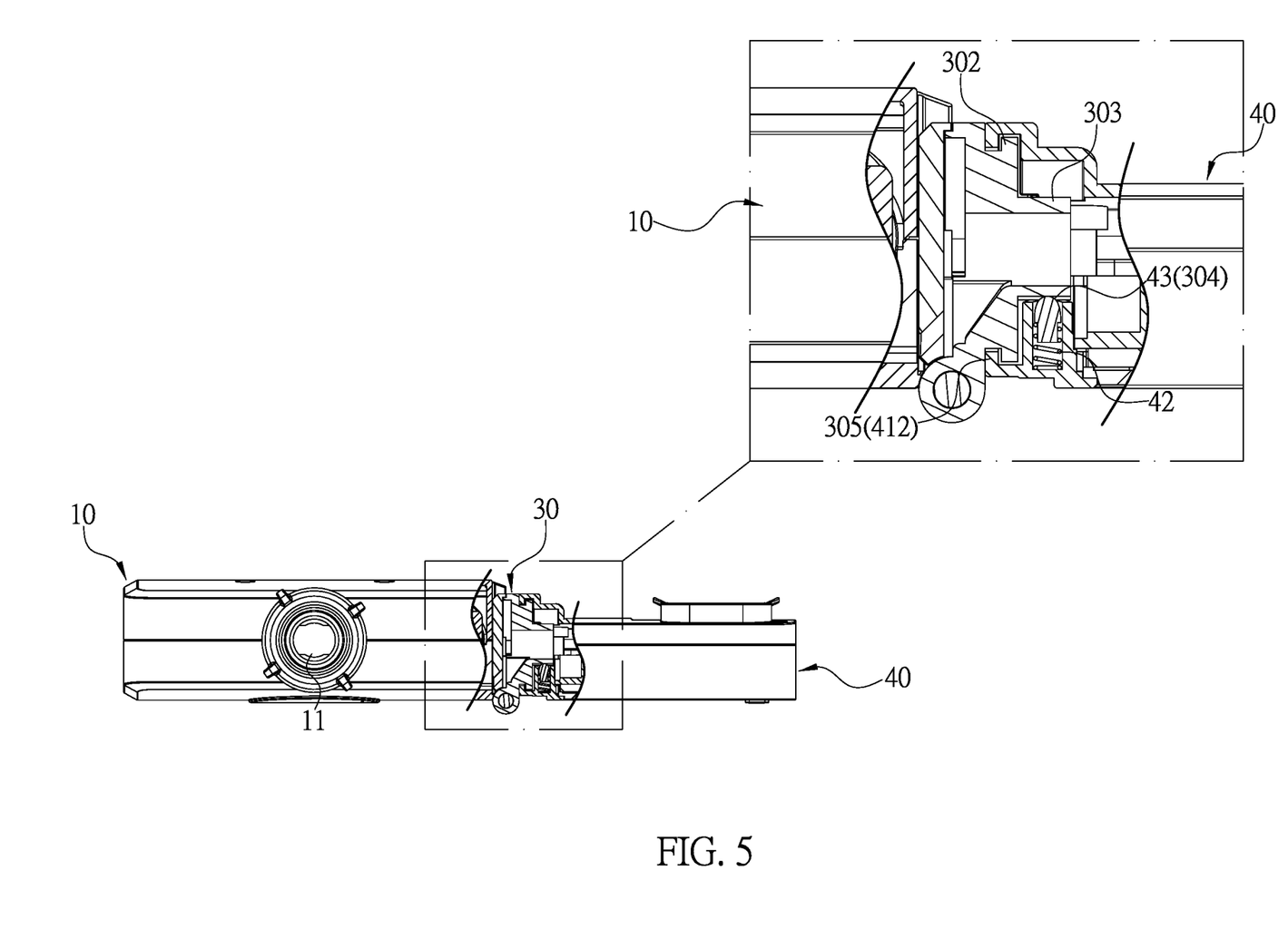
FIG. 5 is another sectional view of the preferred embodiment according to the present invention.
Figure 6:
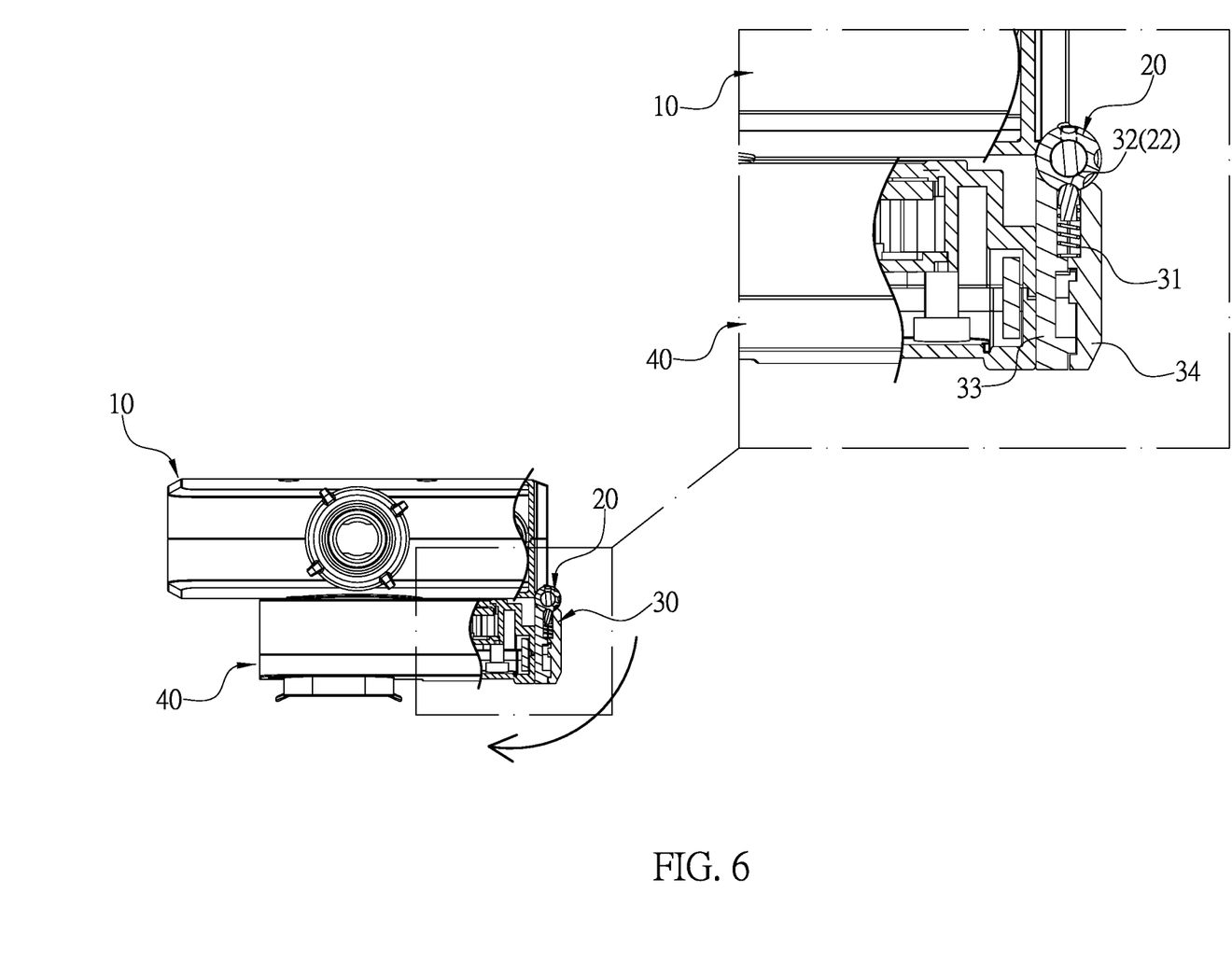
FIG. 6 shows a folded state of the preferred embodiment according to the present invention.
Figure 7:
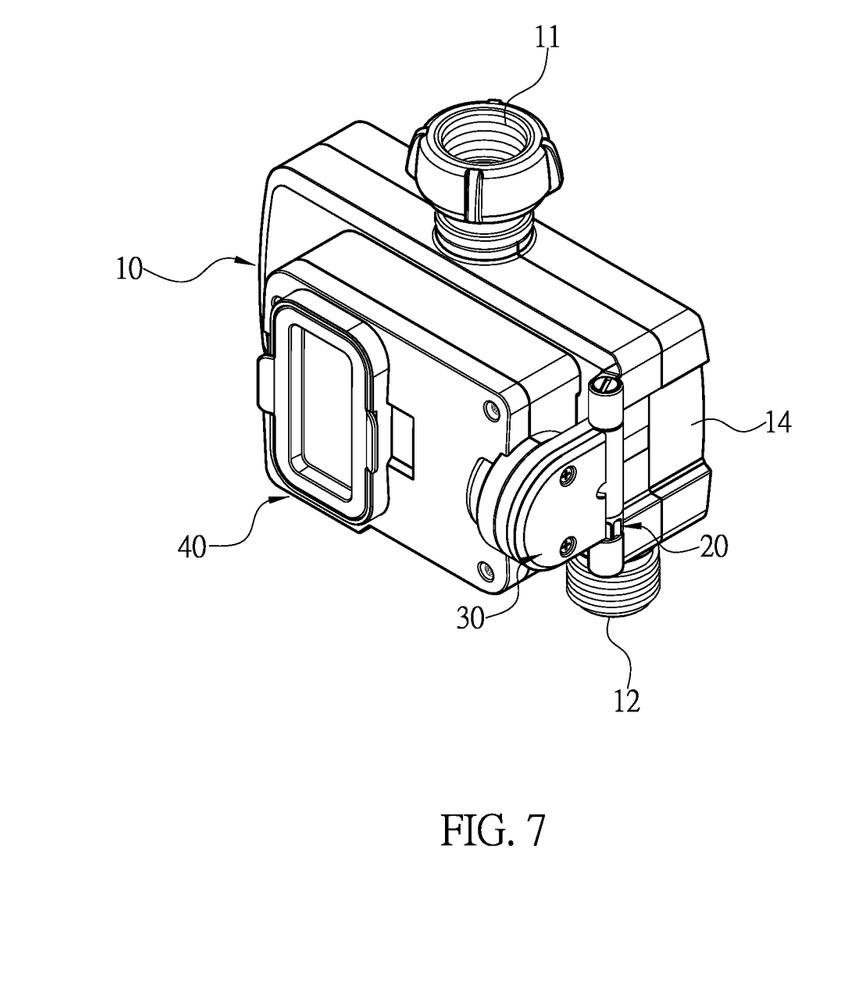
FIG. 7 is a perspective view of a folded embodiment according to the present invention.
Figure 8:
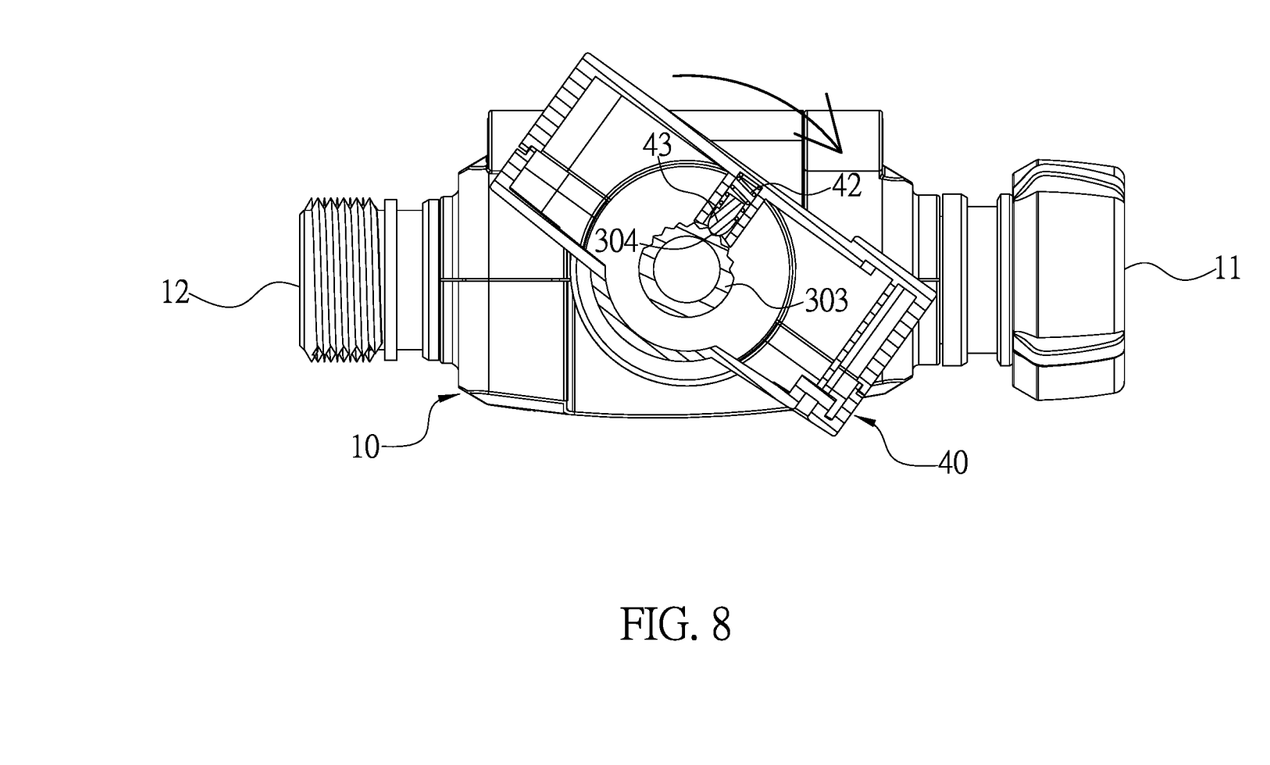
FIG. 8 shows the display panel being adjusted according to the present invention.
Figure 9:
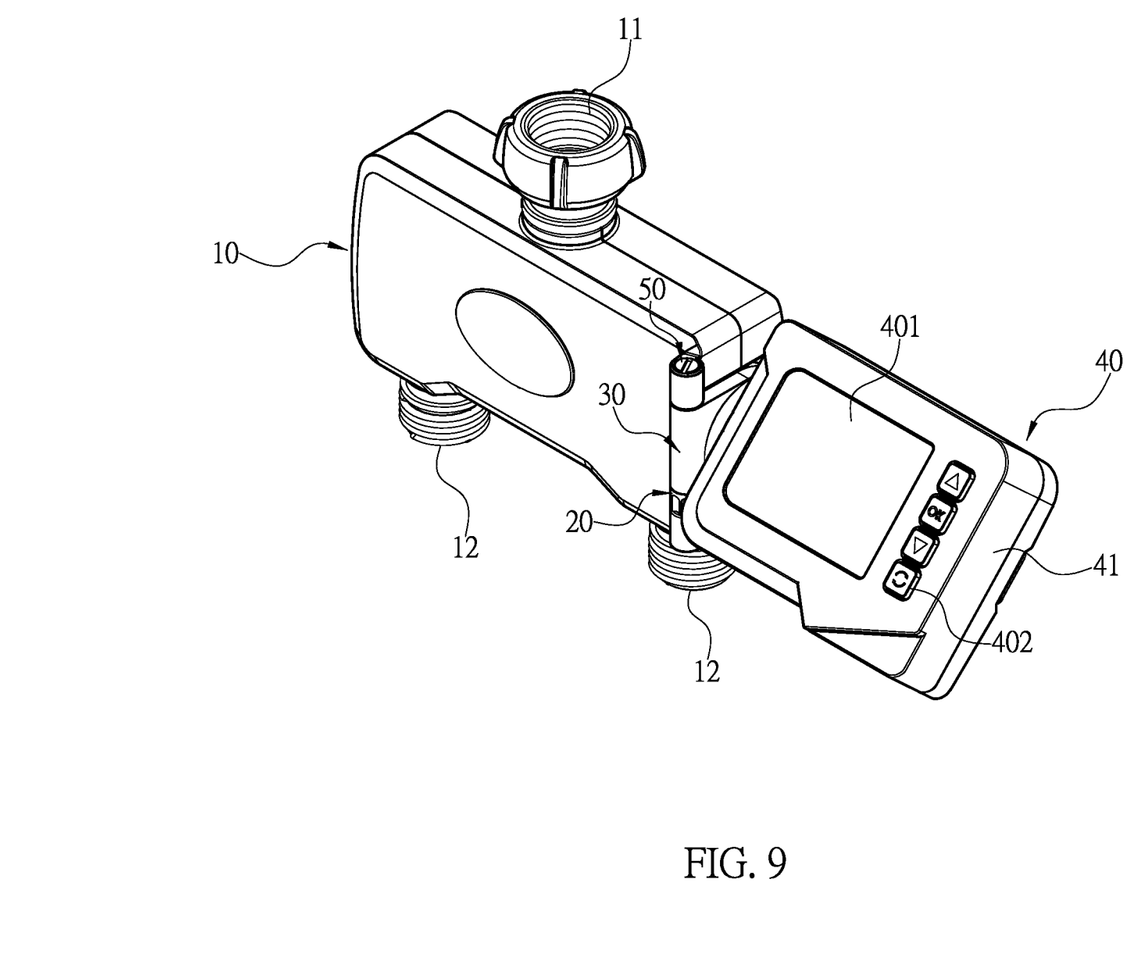
FIG. 9 is a perspective view of the preferred embodiment according to the present invention after the adjustment of the display panel.

In actual use, the movable housing 41 can be folded together with the timer 40 to greatly reduce the volume, please view it from FIG. 6 and FIG. 7 at the same time. In order to fold, the movable housing 41 is pushed towards the side surface of the main body 10, so that the first positioning pin 32 can be forced to pass the first positioning recesses 22 one by one, and the connecting disk 30 rotates to allow the movable housing 41 and the timer 40 being folded together. The pivoting of the movable housing 41 on the connecting disk 30 allows the second positioning pin 43 to be able to engage with the second positioning recess 304 at another suitable position, so that the display panel 401 can be adjusted to an optimal viewing angle, as shown in FIG. 8 and FIG. 9.

With the structure of the above specific embodiment, the following benefits can be obtained: The timer 40 and the display panel 401 together can be adjusted to an optimal viewing angle as the movable housing 41 pivots on the connecting disk 30. After the pivot adjustment, the movable housing 41 and the timer 40 can be securely positioned through the structural design, the garden hose flow control valve can be operated without affecting the display panel 40, and each user can adjust according to their preferring setting. Again, the angle of the timer 40 is adjustable, and the dust, sand particles, and water droplets remaining on the display panel 401 can be easily removed so that the display panel 401 can always be kept clean for easy handling and inspection. Furthermore, the timer 40 and the main body 10 can be folded together to greatly reduce the volume in packaging or storage.

Although the present invention has been explained in relation to its preferred embodiment, it is to be understood that many other possible modifications and variations can be made without departing from the spirit and scope of invention as hereinafter claimed.

What is claimed is:

1. A garden hose flow control valve with a foldable panel comprising: a main body, a positioning block, a connecting disk and a timer, wherein:
    the main body has an intake opening and at least one outlet opening with a pivoting portion on a side, the pivoting portion having two separated trunnions, a limiting protrusion disposed on an inner side of each trunnion such that the main body is capable of using the pivoting portion to pivotally connect to the connecting disk;
    the positioning block has a through hole at a center of the positioning block, and a plurality of first positioning recesses on an outer side of the positioning block, an end of the positioning block comprising an engaging groove for engaging with the limiting protrusions, such that when the positioning block is stacked above the trunnions, the positioning block is not rotable;
    the connecting disk has a first positioning pin pushed by a first spring, a pivoting aperture at a side edge for aligning with the through hole of the positioning block placed above the trunnions, and a pivot shaft passing through the trunnions, the pivoting aperture and the through hole, such that the connecting disk is pivoted on the main body and the first spring pushes the first positioning pin into a first positioning recess; and a protrusion with a sleeve is provided on one side of the connecting disk, the sleeve configured to jacket onto a movable housing of the timer, and a plurality of second positioning recesses are disposed around the sleeve; and
    the timer is mounted in the movable housing and has a display panel and an operation interface on the movable housing, a side of the movable housing is provided with a connecting opening, the connecting opening further having a second positioning pin pushed by a second spring; wherein when the connecting opening of the movable housing is assembled with the sleeve of the connecting disk, the second positioning pin is engaged with one of the second positioning recesses, and the timer and the movable housing are locked.

2. The garden hose flow control valve with a foldable panel as claimed in claim 1, wherein the main body further comprises an electromagnetic valve for closing or opening the main body.

3. The garden hose flow control valve with a foldable panel as claimed in claim 1, wherein the main body further has an indentation for accepting the connecting disk.

4. The garden hose flow control valve with a foldable panel as claimed in claim 1, wherein the connecting disk has a first disk portion and a second disk portion paring with each other, and the pivoting aperture, the protrusion and the sleeve are mounted on the first disk portion.

5. The garden hose flow control valve with a foldable panel as claimed in claim 1, wherein the movable housing comprises two corresponding casings, the protrusion of the connecting disk has a ring slot, and the connecting opening of the movable housing has a clasp configured to engage the ring slot to prevent the movable housing from separating from the connecting disk.

6. The garden hose flow control valve with a foldable panel as claimed in claim 1, wherein the timer includes a battery.

7. The garden hose flow control valve with a foldable panel as claimed in claim 1, wherein the timer is water-resistant.

\* \* \* \* \*